Oct. 1, 1957  D. RHEE ET AL  2,808,491
ELECTRICAL CONTACTOR
Filed Jan. 27, 1954

INVENTORS
DANIEL RHEE and
DONALD COCKBURN
BY
Burns, Doane, Benedict & Brown
ATTORNEYS

United States Patent Office 2,808,491
Patented Oct. 1, 1957

2,808,491

ELECTRICAL CONTACTOR

Daniel Rhee, Rehoboth, Mass., and Donald Cockburn, Warren, R. I.

Application January 27, 1954, Serial No. 406,397

4 Claims. (Cl. 200—166)

This invention relates to a contactor particularly adapted to permit selective electrical intercoupling between relatively movable parts of an apparatus. More specifically the invention as described hereinafter is directed to a grounding flap structure for electrically interconnecting an autoclave and its load-carrying carriage when such carriage is appropriately positioned within the autoclave while allowing ready disconnection for movement of the carriage out of the autoclave.

This application is a continuation-in-part of applicants' prior application Serial No. 347,731, filed April 9, 1953, entitled "Apparatus for Vulcanizing Rubber Thread," now Patent 2,743,479. In such prior application there is disclosed an apparatus for vulcanizing sheet rubber wherein a sheet of calendered rubber to be vulcanized is wound on a cylinder rotatably mounted on an autoclave carriage. When the carriage carrying the sheet rubber load is properly positioned within the autoclave the sheet rubber is vulcanized by the combined action of a steam heating means and a high-frequency dielectric heating means.

The details of the overall rubber vulcanizing apparatus are fully and completely set forth in the above-noted copending application. However, as background pertinent to the hereinafter described invention, it is pointed out that in the vulcanizing apparatus described in such application the dielectric heating performed on the sheet rubber load takes place between a semi-cylindrical electrode mounted interiorly of and concentric with the cylindrical wall of the autoclave casing and the carriage cylinder which has wound thereon the calendered sheet rubber to be vulcanized. To couple these two electrode means, namely, the semi-cylindrical electrode and the load-carrying cylinder across the output of a high-frequency generator to produce the dielectric heating therebetween, the cylinder is grounded to the autoclave structural parts. This grounding of the autoclave carriage to the structural parts of the autoclave while the semi-cylindrical electrode is maintained electrically insulated from such autoclave structure permits the high-frequency generator to be connected on one side to the semi-cylindrical electrode by a suitably insulated lead-in connection and the other side of the generator to be connected directly to the autoclave casing which is at ground potential.

In addition to facilitating connection of the high-frequency generator to the load carrying cylinder, the grounding of the autoclave carriage to the structural parts of the autoclave insures that the carriage, cylinder and autoclave are maintained at ground potential to avoid the possibility of operating personnel being exposed to the high-frequency potential upon contact with the autoclave or carriage.

After the calendered sheet rubber has been wound around the carriage cylinder, the carriage is rolled into the autoclave on rails provided within the autoclave so that the cylinder will be centered beneath the semi-cylindrical electrode, all as described and illustrated in the hereinabove noted prior application. Since the carriage must be moved in and out of the autoclave for loading and unloading of the sheet rubber, and further since the carriage and autoclave must be electrically coupled to be at ground potential during the vulcanizing operation, means must be provided which will not interfere with the introduction and removal of the carriage from the autoclave and yet will insure that perfect electrical coupling between the two parts is secured when the carriage and autoclave are properly positioned for the vulcanization operation. Thus a contactor must be provided which may be readily actuated to electrically couple the carriage and autoclave during the vulcanization process, and which may likewise be simply operated to uncouple the parts and not interfere with the carriage being taken from and moved into the autoclave before and after each vulcanization operation.

Accordingly it is a principal object of this invention to provide a pivotally mounted electrical contactor structure carried by an autoclave carriage which is of an improved and highly effective construction to promote more perfect electrical coupling between the autoclave carriage and autoclave casing when such carriage is positioned in the autoclave, and which may be readily moved out of the way to preclude its interfering with movement of the carriage into and out of the autoclave.

It is a further object of this invention to provide a pivotally mounted grounding flap having mutually independent contact sections spaced along the side of the autoclave carriage with such sections being formed of resilient material so as to be deformable upon contact with the interior wall of the autoclave and/or the autoclave carriage, to more perfectly electrically couple the autoclave and carriage.

It is an additional object of this invention to provide an electrical contactor adapted to be pivotally mounted on an autoclave carriage and having means to cooperate with the carriage to selectively retain such contactor in an extended position for contact with the autoclave wall or in a retracted position so as to preclude its interference with movement of the carriage into and out of the autoclave.

For the accomplishment of the foregoing and related objects, which will be apparent from the description of a specific embodiment of the invention as described hereinafter, this invention comprises the means hereinafter fully described and particularly pointed out in the claims. The structure illustrated in the annexed drawing is but one of various mechanical forms in which the principles of this invention may be applied.

Referring to the drawings.

Figure 1:
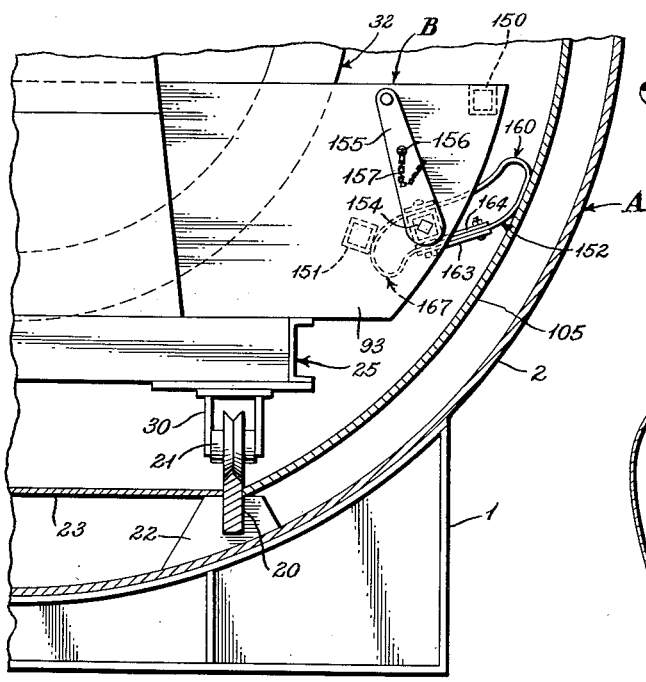
Figure 1 is a partial sectional view illustrating the electrical contactor applied to an autoclave carriage and cooperating with the wall of an autoclave.

Referring specifically to Figure 1 of the drawing, there is shown thereon an application of the electrical contactor of this invention to an autoclave A and autoclave carriage B. Specific details of such autoclave and carriage construction are more fully described in applicants' copending application Serial No. 347,731, filed April 9, 1953, now Patent 2,743,479, while Figure 1 herein illustrates only a portion of the autoclave and carriage.

The autoclave A is supported on members 1 engaging the outer cylindrical casing 2 of the autoclave. A pair of rails 20 are mounted in spaced parallel relation along the bottom of the cylindrical casing 2 on supports 22 and an annular space is provided inwardly of the cylindrical casing 2 by a plate 23 connected between the rails 20 and a separating sheet 105. This annular space houses steam heating coils which, in combination with high-frequency dielectric heating means, produces vulcanization of the sheet rubber supported on the autoclave carriage B.

The load supporting carriage B has a plurality of grooved wheels 21 cooperating with the rails 20 to guide the movement of the carriage B into and out of the autoclave, with such wheels being suitably journaled on bearing supports 30 secured to the underside of the carriage's channel iron frame indicated generally at 25. The sheet rubber to be vulcanized is wound on a cylinder 32 rotatably supported on the carriage B so that the axis thereof coincides with the axial center line of the cylindrical casing 2 when the carriage is positioned within the autoclave A.

A transverse plate 93 is supported upon the channel iron frame 25 and extends across the end of the cylinder 32 at one end of the autoclave carriage B. A similar transverse plate is positioned at the other end of the autoclave carriage to extend across the opposite end of the cylinder 32. A reinforcing rail 150 having a square cross section is connected between the transverse plate 93 and the similar plate mounted at the opposite end of the autoclave carriage so as to extend longitudinally along the side of the autoclave carriage B adjacent the outer surface of the load carrying cylinder 32. A similar rail 151 is secured between the transverse plate 93 and the similar plate at the opposite end of carriage B to serve both as a reinforcing member between the two plates and as a contact surface for one series of contacts of the electrical contactor in a manner as will be described in detail hereinafter.

An electrical contactor 152 extends between the transverse plate 93 and the similar plate at the opposite end of the carriage B, and is pivotally mounted thereon so as to be movable into and out of engagement with the separating sheet 105 which forms one of the structural elements of the autoclave A. The pivotal mounting of the electrical contactor 152 in the transverse plates may be accomplished in any suitable manner such as by providing an aperture through each of the plates so that the ends of the mounting rod for the contactor may extend therethrough and thus be journaled therein.

Figure 3:
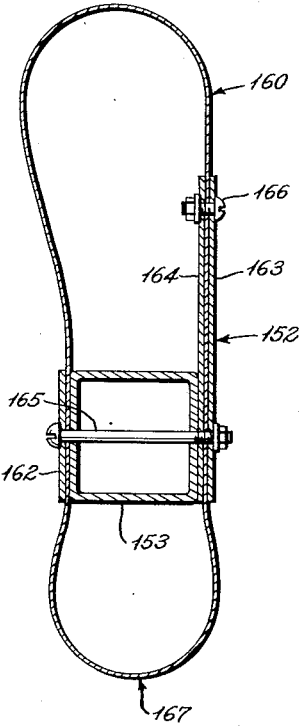
Figure 3 is a sectional view taken on line 3—3 of Figure 2.
Figure 2:
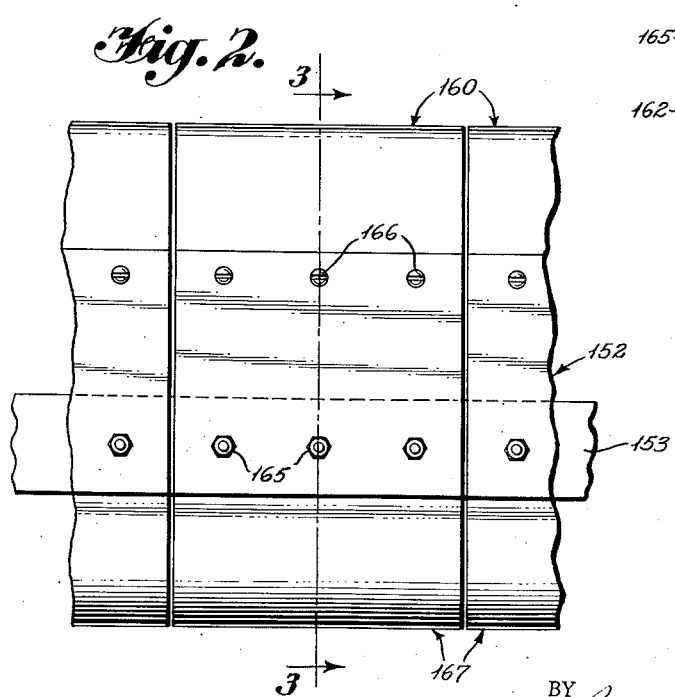
Figure 2 is an elevational view showing a portion of the length of the electrical contactor of this invention.

Figures 2 and 3 illustrate the specific construction of the electrical contactor 152 of the instant invention. In the specific embodiment illustrated a mounting rod 153 is shown having a square cross sectional form. It will be readily recognized that within the scope of the instant invention such mounting rod may be made of any suitable desired cross section to carry the contact sections thereon. In the case of the square cross section mounting rod 153, the opposite ends thereof are suitably formed or provided with cylindrical extensions to permit pivotal mounting of such rod in the apertures formed in the transverse plate 93 and the similar transverse plate at the opposite end of the carriage B. The outer end of rod 153 is provided with a squared driving stud 154 which, as shown in Figure 1 extends outwardly of the transverse plate 93 to permit the attachment thereto of a crank 155. The crank 155 cooperates with the squared driving stud 154 to oscillate mounting rod 150 and thus move the electrical contactor into and out of engagement with the autoclave A as desired.

To retain the electrical contactor in a desired set position, the crank 155 is provided with an aperture which receives a pin 156 which may be projected into an opening provided in the transverse plate 93. Thus when the electrical contactor is moved outwardly by actuation of crank 155 to engage the autoclave A as shown in Figure 1, the pin 156 inserted through the aligned holes in crank 155 and transverse plate 93 serves to retain the contactor in firm engagement with the autoclave to insure proper electrical intercoupling between the autoclave carriage B and autoclave A. The pin 156 may be suitably retained ready for use by being secured to a length of chain 157 the opposite end of which is attached to the crank 155, or to transverse plate 93.

The individual contact sections for the electrical contactor 152 are each made up of a strip of flexible resilient material secured to the opposite sides of the mounting rod 153 and bowed or looped outwardly from rod 153 to provide a series of separate resiliently yieldable contacts 160 spaced along the length of the rod 153.

The strips of flexible resilient material are secured to the opposite sides of rod 153 by a plate 162 overlying each strip on one side of rod 153 and a pair of plates 163 and 164 embracing a portion of each strip on the opposite side of rod 153. A series of suitable threaded connectors 165 extend diametrically through the mounting rod 153 to fasten the appropriate portions of the strips to the opposite sides of the mounting rod. In addition to the threaded connectors 165, the pair of plates 163 and 164 are connected through the respective strips by a series of threaded fasteners 166. These latter fasteners serve to firmly draw up the plates 163 and 164 so that the strip is firmly clamped therebetween.

The attachment of the flexible resilient strips at spaced positions along the length of the mounting rod 153 provides a series of mutually independent yieldable contacts 160 extending from one side of the rod. The continuations of these strips, or if desired, separate similar strips bowed or looped away from the opposite side of rod 153 provide a second series of resiliently yieldable contacts 167. Whereas the first series of contacts 160 are adapted to engage the autoclave A, the second series of contacts 67 engage the carriage B to afford an evenly distributed electrical contact between the carriage and autoclave along substantially the entire length of the carriage.

With electrical contactor 152 pivotally mounted between the transverse plates at the ends of the carriage B, pivoting of such contactor in an outward direction results in the yieldable resilient contacts 160 along the length of rod 153 engaging the sheet 105 which forms a part of the autoclave A. These yieldable contacts are deformed by engagement with the sheet 105 to such an extent that they brush across the surface of sheet 105 so that in their final position, as shown in Figure 1, a highly effective electrical contact is obtained between the contacts 160 and the autoclave A. It will be further noted that the pair of plates 163 and 164, by extending for a distance laterally of the rod 153, provide rigidity for the yieldable contacts 160 so that they will be firmly urged against the sheet 105 as the contactor is pivoted outwardly.

The loop or bowed yieldable contacts 167 opposite the contacts 160, upon pivoting of rod 153, are moved into contact with reinforcing rail 151 and in a manner similar to the contacting action between sheet 105 and the first series of yieldable contacts 160, this second series of yieldable contacts 167 brush across and are deformed by rail 151 so as to effect a more perfect electrical contact between rail 151 and each of the yieldable contacts 167. The provision of the smaller bowed contacts 167 engaging the rail 151 insures a more effective electrical coupling of the entire length of the carriage B to the autoclave A and alleviates the necessity for the electrical intercoupling to be effected through only the pivotal mounting of rod 153 in the transverse plates at the ends of the carriage B.

In illustrating the instant invention, Figure 1 shows only a portion of the end of the carriage B and autoclave A so as to simplify the illustration of this invention as applied to the overall structure specifically disclosed and illustrated in applicants' copending application Serial No. 347,731, filed April 9, 1953, now Patent 2,743,479. Thus in Figure 1 of the instant application there is illustrated only one side of the autoclave carriage B carrying an electrical contactor 152 which extends along the length of the carriage. It will be appreciated that the opposite side of the carriage B is similarly provided with a pivotally mounted contactor 152 to engage the autoclave A and thus insure balanced grounding of the carriage B to the autoclave A to enable the autoclave to be connected to the ground side of the high-frequency generator in connecting the apparatus for dielectric heating.

The provision of grounding flaps on both side of the autoclave carriage B is clearly illustrated and described in the hereinbefore noted prior application and the teaching of the specific electrical contactor in the instant application is fully applicable to the copending application. In this respect, it will be further noted that the electrical contactor 152 in the instant application is mounted upwardly adjacent the side of the autoclave carriage. However, within the scope of this invention such contactor may be mounted downwardly near the underside of the carriage structure in a manner such as illustrated and described in applicants' copending application. It will of course be recognized that in mounting the contactor toward the underside of the carriage B, the yieldable contacts 160 and 167 of the contactor as disclosed hereinabove will engage appropriate parts on the autoclave and carriage so as to produce the desired electrical intercoupling between the carriage B and autoclave A.

As described hereinabove the electrical contactor 152 is constructed with a series of separate resilient yieldable contacts 160 and 167 extending outwardly from opposite sides of the mounting rod 153. The provision of mutually independent contacts along the length of the contactor is preferred since this permits more effective and uniform electrical coupling along the entire length of the carriage. Such separate contacts can more readily adjust to offset any misalignment of the carriage relative to the autoclave wall and/or uneven surfaces along the autoclave wall. However, it will be appreciated that within the scope of the instant invention the bowed contacts protruding from the opposite side of mounting rod 153 may be formed of a length or lengths of flexible resilient material bent and secured to the opposite side of the rod so as to provide a single elongated yieldable contact extending from each side of the rod and being continuous along the length of the mounting rod.

Having thus described our invention, what we claim is:

1. In a rubber vulcanizing apparatus including an autoclave and a carriage movable into said autoclave to position a sheet rubber load to be vulcanized therein, contactor means for electrically intercoupling said autoclave and said carriage along the major portion of their length comprising a mounting rod adapted to be pivotally supported adjacent the side of said carriage, said rod having means for mounting it on said carriage to be pivotal about the axis of said rod, a series of contact sections secured at spaced positions along the length of said rod, each of said sections having a continuous strip of flexible resilient material attached to the opposite sides of said rod with freely bowed resilient portions intermediate the points of attachment extending outwardly from opposite sides of said rod to provide oppositely directed resiliently yieldable loop contacts for engagement with the autoclave wall and carriage respectively upon pivotal actuation of said rod.

2. In a rubber vulcanizing apparatus as recited in claim 1, each of said contact sections further comprising a plate secured to said rod and overlying said strip at one of the points of attachment thereof to said rod, and a pair of plates disposed on the opposite faces of said strip at the other point of its attachment to said rod, said pair of plates extending outwardly from said rod with the strip positioned therebetween to provide rigidity for the yieldable loop contact protruding from one side of said rod.

3. In a rubber vulcanizing apparatus as recited in claim 1, said contactor means further comprising an actuating crank operatively mounted on one end of said rod to facilitate pivotal actuation of said rod and retaining means associated with said crank to selectively position said crank in the desired extended or retracted position of said contactor means.

4. An electrical contactor comprising a mounting rod having end portions aligned with the axis of said rod for supporting said rod to pivot about the axis thereof, a series of mutually independent contact sections secured to said rod at spaced locations along the length thereof, each of said sections having a continuous strip of flexible resilient material attached to the opposite sides of said rod and bowed outwardly from the sides of said rod intermediate the points of attachment to provide oppositely directed resiliently yieldable loop contacts along the length of said rod, said loop contacts being adapted to be yieldably deformed upon engagement with an element to be electrically coupled thereto when said rod is pivoted about its axis.

References Cited in the file of this patent
UNITED STATES PATENTS

| | | |
|---|---|---|
| 1,399,492 | Krantz | Dec. 6, 1921 |
| 2,020,913 | Schramm | Nov. 12, 1935 |